(12) United States Patent
Asukai et al.

(10) Patent No.: US 10,661,988 B2
(45) Date of Patent: May 26, 2020

(54) LOW TEMPERATURE STORAGE SYSTEM, TRANSPORT MECHANISM, AND LOW TEMPERATURE STORAGE VESSEL

(71) Applicant: TSUBAKIMOTO CHAIN CO., Osaka-shi, Osaka (JP)

(72) Inventors: Masahiro Asukai, Osaka (JP); Tomokatsu Takahashi, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 242 days.

(21) Appl. No.: 15/483,325

(22) Filed: Apr. 10, 2017

(65) Prior Publication Data

US 2017/0210560 A1 Jul. 27, 2017

Related U.S. Application Data

(63) Continuation of application No. PCT/JP2015/072174, filed on Aug. 5, 2015.

(30) Foreign Application Priority Data

Oct. 31, 2014 (JP) ................................ 2014-222624

(51) Int. Cl.
*B65G 1/04* (2006.01)
*G01N 1/42* (2006.01)
(Continued)

(52) U.S. Cl.
CPC ................ *B65G 1/04* (2013.01); *B01L 7/50* (2013.01); *B01L 9/00* (2013.01); *B01L 9/06* (2013.01);
(Continued)

(58) Field of Classification Search
CPC ............ F25D 3/11; F25D 25/027; B65G 1/04
See application file for complete search history.

(56) References Cited

U.S. PATENT DOCUMENTS 3,163,994 A * 1/1965 Haumann ................. F17C 3/02
221/150 R
5,964,095 A 10/1999 Coelho et al.
(Continued)

FOREIGN PATENT DOCUMENTS

EP 1543278 B1 6/2005
EP 2614320 B1 7/2013
(Continued)

OTHER PUBLICATIONS

International Search Report dated Nov. 10, 2015 issued in counterpart International Application No. PCT/JP2015/072174 (2 pages).
(Continued)

*Primary Examiner* — Jonathan Snelting
(74) *Attorney, Agent, or Firm* — Westerman, Hattori, Daniels & Adrian, LLP

(57) ABSTRACT

A low temperature storage system, a transport mechanism, and a low temperature storage vessel are provided, which enable downsizing and simplification of the transport mechanism, as well as stable transport of stored objects. A low temperature storage system (1) includes a low temperature storage vessel (10) and a transport mechanism (20). The transport mechanism (20) includes a reciprocating part (30) that has a holding part (35) and that is capable of reciprocating along a transfer direction, and guide unit (40). The guide unit (40) include an in-vessel guide (50) fixedly placed inside the low temperature storage vessel (10), and a telescopic guide (60) configured to be able to extend and contract along the transfer direction. The telescopic guide (60) is provided independently of the in-vessel guide (50) so as to be connectable to the in-vessel guide (50).

6 Claims, 7 Drawing Sheets

(51) Int. Cl.
  *B01L 7/00* (2006.01)
  *F25D 25/02* (2006.01)
  *B01L 9/06* (2006.01)
  *B01L 9/00* (2006.01)
  *F25D 3/11* (2006.01)
  *B65D 25/10* (2006.01)
  *B65D 81/18* (2006.01)
  *G01N 35/04* (2006.01)
  *F25D 25/04* (2006.01)
  *G01N 35/00* (2006.01)

(52) U.S. Cl.
  CPC ............ *B65D 25/10* (2013.01); *B65D 81/18* (2013.01); *F25D 3/11* (2013.01); *F25D 25/027* (2013.01); *G01N 1/42* (2013.01); *B01L 2200/04* (2013.01); *F25D 25/04* (2013.01); *G01N 2035/00435* (2013.01); *G01N 2035/042* (2013.01); *G01N 2035/0425* (2013.01); *G01N 2035/0441* (2013.01); *G01N 2035/0451* (2013.01)

(56) References Cited

U.S. PATENT DOCUMENTS

| | | | |
|---|---|---|---|
| 6,302,327 | B1 | 10/2001 | Coelho et al. |
| 7,197,884 | B2* | 4/2007 | Jones ............ A01N 1/02 62/86 |
| 7,527,764 | B2* | 5/2009 | Angelantoni ....... F25D 25/00 422/65 |
| 7,540,168 | B2* | 6/2009 | Schumann ........ A01N 1/02 62/378 |
| 8,372,634 | B2* | 2/2013 | Lin ............... A01N 1/0236 211/144 |
| 8,857,208 | B2* | 10/2014 | Malin ............ F25D 25/04 62/440 |
| 2004/0213651 | A1* | 10/2004 | Malin ............ B65G 1/045 414/331.05 |
| 2005/0188705 | A1 | 9/2005 | Jones et al. |
| 2005/0260102 | A1 | 11/2005 | Angelantoni et al. |
| 2008/0092581 | A1 | 4/2008 | Schumann et al. |

FOREIGN PATENT DOCUMENTS

| | | |
|---|---|---|
| JP | 2002-511827 A | 4/2002 |
| JP | 2006-500302 A | 1/2006 |
| JP | 4039701 B2 | 1/2008 |
| JP | 2012-56730 A | 3/2012 |
| WO | 91/02203 A1 | 2/1991 |

OTHER PUBLICATIONS

Extended (supplementary) European Search Report dated Apr. 24, 2018, issued in counterpart European Application No. 158547125. (5 pages).

* cited by examiner

LOW TEMPERATURE STORAGE SYSTEM, TRANSPORT MECHANISM, AND LOW TEMPERATURE STORAGE VESSEL

TECHNICAL FIELD

The present invention relates to a low temperature storage system for storing objects at low temperatures, and more particularly to a low temperature storage system, a transport mechanism, and a low temperature storage vessel for low temperature storage of samples that are used for drug development in drug discovery and design processes in medicine, bioengineering, and pharmaceutics.

BACKGROUND ART

Low temperature storage systems that store containers containing samples at low temperatures have hitherto been known. One such system includes a storage tray that accommodates a plurality of storage plates each holding a plurality of containers and stacked up and down, a low temperature storage chamber storing a plurality of storage trays, an operation room provided adjacent the low temperature storage chamber and kept at a lower temperature than that of the ambient environment, a loading/unloading chamber provided adjacent the operation room, a plate transfer mechanism provided inside the operation room for transferring the storage plates and loading and unloading them to and from the storage tray, and a pickup mechanism provided in the operation room and capable of picking containers individually from a storage plate (see, for example, Patent Literature 1).

The plate transfer mechanism includes a storage tray mover that conveys the storage trays individually from the low temperature storage chamber to the operation room in the up-down direction, and a storage plate mover that moves the storage plates individually out of and onto a storage tray. The plate transfer mechanism is configured to be movable inside the operation room.

In this low temperature storage system of Patent Literature 1, a plurality of containers are held on a storage plate, and a plurality of storage plates are held on a storage tray. When a desired container is to be retrieved from the low temperature storage chamber, the storage tray is removed from the low temperature storage chamber. After that, the storage plate is taken out of the storage tray in the operation room, and the desired container is picked up from the storage plate.

CITATION LIST

Patent Literature

Patent Literature 1: Japanese Patent Application Laid-open No. 2012-56730
Patent Literature 2: Japanese Patent No. 4039701

SUMMARY OF INVENTION

Technical Problem

In the low temperature storage system of Patent Literature 1, the storage tray needs to be taken out of the low temperature storage chamber when retrieving a desired container from the low temperature chamber. This means that undesired storage plates and containers are also moved out of the low temperature storage chamber to the operation room. In the operation room where the temperature is higher than that in the low temperature storage chamber, the temperature of the containers other than the desired one is also raised. This could result in deterioration of the quality of the samples contained in the containers, and also lead to the problem that the temperature of the low temperature storage chamber rises when the storage tray of a raised temperature is returned to the low temperature storage chamber, and a high cost may be required for the cooling material for cooling the low temperature storage chamber.

The problem described above will be more significant when the temperature of the low temperature storage chamber is set to an ultra low temperature with a cooling material such as liquid nitrogen or the like, because of a large difference between the temperature in the low temperature storage chamber and the temperature in the operation room.

To solve the problem described above, instead of taking out the storage tray accommodating a plurality of storage plates, an arm (periscope) supported outside the low temperature storage chamber may be moved up and down with a linear drive cylinder, and a storage plate (can) may be directly hoisted up with a holding part (hook) formed at the lower end (free end) of this arm (see, for example, Patent Literature 2).

The transport mechanism described in Patent Literature 2, however, adopts a cantilever structure wherein the arm is supported outside the low temperature storage chamber. Therefore, the arm is prone to lateral vibration when moving into the low temperature storage chamber, because of which it was difficult to secure positioning accuracy of the holding part formed to the arm.

To minimize such lateral vibration of the arm, the section modulus of the arm itself could be increased, or a guide member could be provided for guiding the arm in the up-down direction.

Since the arm is cantilevered outside the low temperature storage chamber, it would be difficult to prevent lateral vibration of the arm completely even if the strength of the arm itself were enhanced. Also, enhancing the arm strength enough to prevent the lateral vibration would cause the arm itself to be large, and in addition, lead to the problem that the mechanism for supporting and driving the arm would become complex and large.

In such a low temperature storage system, it is necessary to close the opening in the low temperature storage chamber with a shutter except when loading and unloading storage plates, in order to prevent escape of the cold air inside the low temperature storage chamber to the outside. This poses limitations on the installation of guide unit for guiding the arm in the up-down direction inside and outside the low temperature storage chamber. As a possible means of avoiding such limitations, a guide member such as a pantograph that is supported outside the low temperature storage chamber and capable of extending and contracting up and down could be provided. In this case, too, since the guide member is cantilevered, it would be difficult to prevent lateral vibration of the guide member. Also, enhancing the strength of the guide member enough to prevent the lateral vibration would lead to the problem of the guide member becoming more complex and larger.

When the transport mechanism (arm and guide member) is complex and large, the space available for a storage area of storage plates inside the low temperature storage chamber is reduced, and also it is necessary to make a large opening in the low temperature storage chamber, which leads to the problem that the cold air inside the low temperature storage chamber can more easily escape to the outside. Also, there is another problem that the installation space for the transport mechanism outside the low temperature storage chamber has to be large enough in the up-down direction.

An object of the present invention is to solve these problems and to provide a low temperature storage system, a transport mechanism, and a low temperature storage vessel that enable downsizing and simplification of the transport mechanism, as well as stable transport of stored objects.

Solution to Problem

A low temperature storage system according to the present invention is a low temperature storage system storing objects at low temperatures and includes: a low temperature storage vessel having a storage area for stored objects, and an opening; and a transport mechanism for loading and unloading stored objects to and from the low temperature storage vessel. The transport mechanism includes a reciprocating part that has a holding part holding stored objects and that is capable of reciprocating along a transfer direction, and guide unit for guiding the reciprocating part along the transfer direction. The guide unit include an in-vessel guide fixedly placed inside the low temperature storage vessel, and a telescopic guide configured to be able to extend and contract along the transfer direction. The telescopic guide is provided independently of the in-vessel guide so as to be connectable to the in-vessel guide. The problems mentioned above are thereby solved.

A transport mechanism according to the present invention is a transport mechanism for a low temperature storage system loading and unloading stored objects to and from a low temperature storage vessel, and includes: a reciprocating part provided so as to be capable of reciprocating along a transfer direction and including a holding part that holds stored objects; and guide unit for guiding the reciprocating part along the transfer direction. The guide unit include a telescopic guide configured to be able to extend and contract along the transfer direction. The telescopic guide is provided independently of an in-vessel guide that is fixedly placed inside the low temperature storage vessel, so as to be connectable to the in-vessel guide. The problems mentioned above are thereby solved.

A low temperature storage vessel according to the present invention is a low temperature storage vessel for a low temperature storage system storing objects at low temperatures. The low temperature storage vessel includes a storage area for stored objects, an opening for allowing stored objects to be loaded and unloaded, and an in-vessel guide fixedly placed inside the low temperature storage vessel, this in-vessel guide guiding a reciprocating part that loads and unloads stored objects along a transfer direction. The in-vessel guide is provided so as to be connectable to a telescopic guide that is configured to be able to extend and contract along the transfer direction and to guide the reciprocating part along the transfer direction. The problems mentioned above are thereby solved.

Advantageous Effects of Invention

According to first, sixth, and eighth aspects of the present invention, the guide unit that guide the reciprocating part along the transfer direction include an in-vessel guide fixedly placed inside the low temperature storage vessel, and a telescopic guide configured to be able to extend and contract along the transfer direction. The telescopic guide is provided independently of the in-vessel guide so as to be able to couple to the in-vessel guide. The in-vessel guide and the telescopic guide are coupled together when loading and unloading stored objects, so that the reciprocating part can be guided by a structure that is supported on both ends. Thus, while downsizing and simplification of the reciprocating part and guide unit are achieved, lateral vibration of the reciprocating part is reliably prevented so that stable transfer of stored objects is achieved.

The downsizing and simplification of the reciprocating part and guide unit in turn enable a large storage area for stored objects to be secured inside the low temperature storage vessel, as well as reduce the size of the opening in the low temperature storage vessel so that the amount of cold air that escapes through the opening is reduced. Also, the installation space for the transport mechanism outside the low temperature storage vessel can be made more compact.

Reliable prevention of lateral vibration of the reciprocating part helps secure the positioning accuracy of the holding part of the reciprocating part, so that stored objects can be arrayed closely inside the low temperature storage vessel, and thus the storage efficiency of stored objects inside the low temperature storage vessel can be improved.

By providing the in-vessel guide and the telescopic guide independently from each other, the in-vessel guide and the telescopic guide can be separated to allow the opening of the low temperature storage vessel to be closed with a shutter except when loading and unloading stored objects, so that escape of cold air through the opening of the low temperature storage vessel can be minimized. Also, the telescopic guide can be shared among a plurality of low temperature storage vessels equipped with the in-vessel guide, whereby the device cost can be reduced.

According to a second aspect of the present invention, rotary drive unit are further provided for rotating the telescopic guide around an axis extending along the transfer direction. The in-vessel guide is provided so as to be rotatable around the axis, and has a rotation transmission part for transmitting rotation of the in-vessel guide to the reciprocating part. Since the torque transmitted from the rotary drive unit to the telescopic guide can be transmitted to the reciprocating part via the in-vessel guide, the reciprocating part and guide unit need not have a large and complex structure to rotate the holding part provided to the reciprocating part.

According to a third aspect of the present invention, the reciprocating part includes a moving body capable of reciprocating along the transfer direction, and a distal end tool connected to the moving body so as to be rotatable relative to the moving body. Since the distal end tool having the holding part can alone be rotated by means of the rotation transmission part of the in-vessel guide without the moving body being rotated, the reciprocating drive unit for moving the moving body back and forth need not be rotated, so that the device structure can be further simplified.

According to a fourth aspect of the present invention, the telescopic guide is configured to engage with a portion of the reciprocating part and to extend and contract in the transfer direction in conjunction with a reciprocal movement of the reciprocating part. Since the telescopic guide does not require its own drive unit for extension and contraction, the device structure can be further simplified.

According to a fifth aspect of the present invention, the opening is provided in the upper face of the low temperature storage vessel, so that escape of cold air in the low temperature storage vessel is minimized and the temperature inside the low temperature storage vessel is maintained low. Also, since the reciprocating part is provided so as to be able to reciprocate along the up-down direction, the requirements for rigidity and the like of the reciprocating part are lower as compared to when the reciprocating part is moved back and forth in a horizontal direction and the like, and thus the degree of freedom in design is increased.

REFERENCE SIGNS LIST

Description of Embodiments

A low temperature storage system 1 according to one embodiment of the present invention will be hereinafter described with reference to the drawings.

Figure 1:
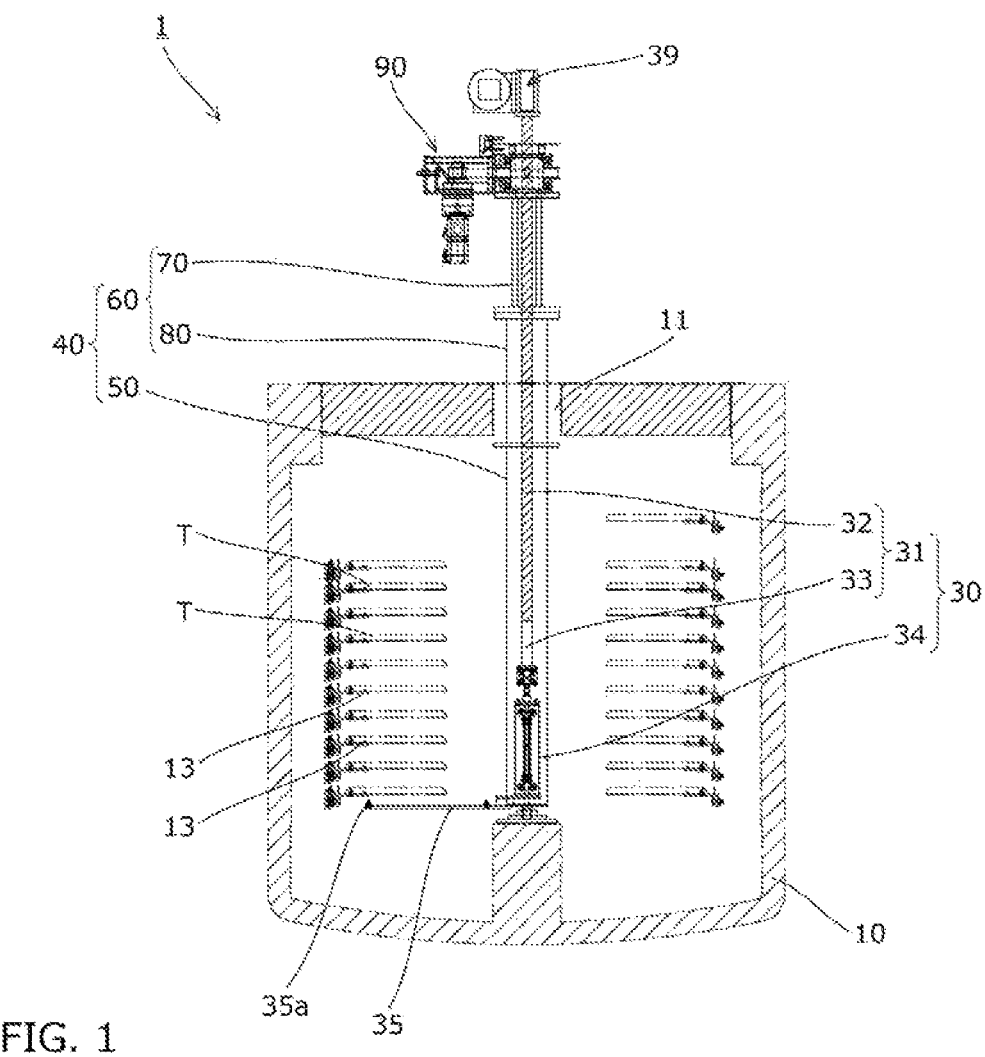
FIG. 1 is a schematic cross-sectional view illustrating a low temperature storage system that is one embodiment of the present invention.

The low temperature storage system 1 stores samples, or stored objects, at low temperatures. As shown in FIG. 1, the system includes a low temperature storage vessel 10, with its interior kept at low temperature, a plurality of disc-like rotary stages 13 disposed inside the low temperature storage vessel 10, a transport mechanism 20 for loading and unloading storage plates P into and out of the low temperature storage vessel 10, and a picking mechanism (not shown) for transferring containers C held on a storage plate P onto another storage plate P.

Figure 6:
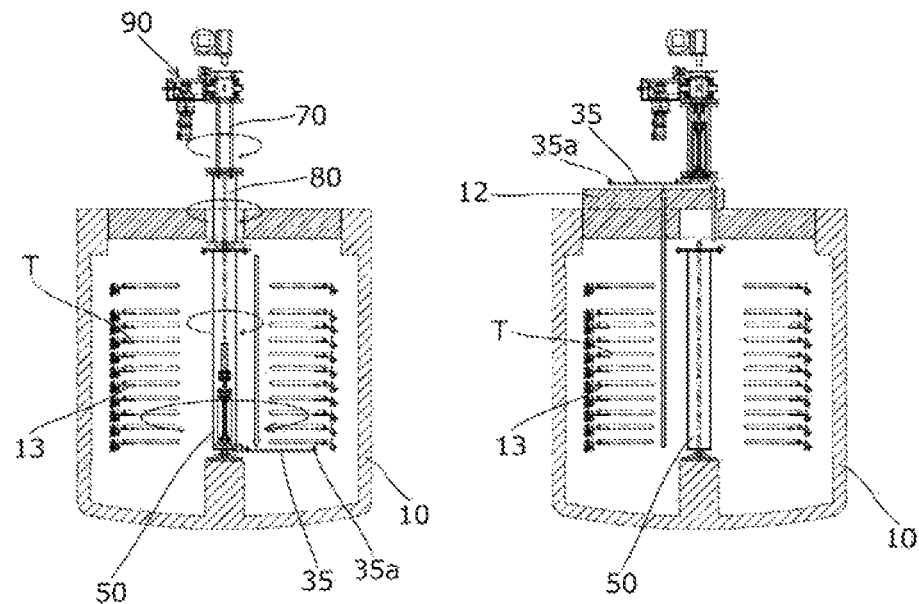
FIG. 6 is a schematic cross-sectional view for explaining the third and fourth operation steps of the low temperature storage system.
Figure 7:
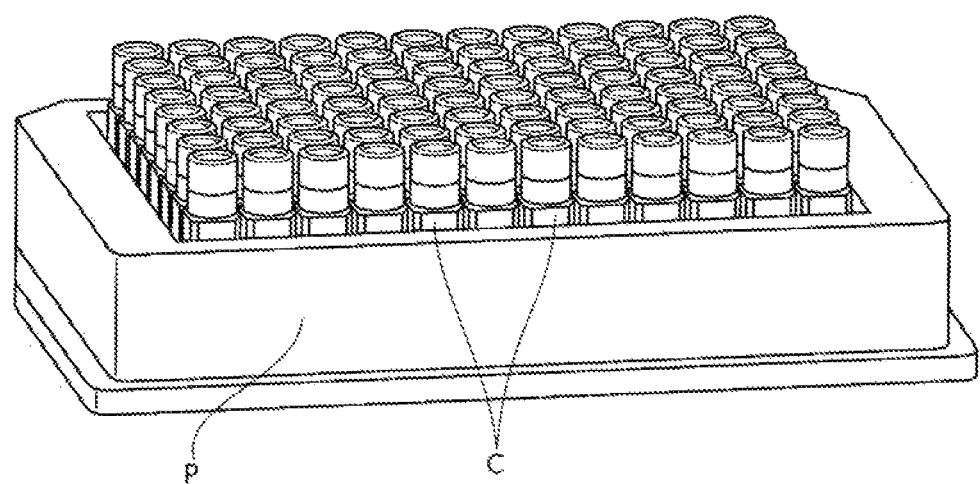
FIG. 7 is a perspective view illustrating one example of stored objects.

The low temperature storage vessel 10 is for storing samples at an ultra low temperature of, e.g., −197° C. with liquid nitrogen filled therein. As shown in FIG. 1, an opening 11 is provided in the upper face of the low temperature storage vessel 10, and a shutter 12 that can be opened and closed such as the one shown in FIG. 6 is provided to the opening 11. By providing the opening 11 in the upper face of the low temperature storage vessel 10, escape of the cold air inside the low temperature storage vessel 10 to the outside is minimized, so that the interior of the low temperature storage vessel 10 can be kept at the low temperature. Since the low temperature storage vessel 10 is designed for storage of samples at an ultra low temperature with liquid nitrogen, it can handle samples such as biological cells that need to be stored at an ultra low temperature of, e.g., −197° C.

The plurality of rotary stages 13 are arranged above and below one another inside the low temperature storage vessel 10 so as to be rotatable independently of each other around a common vertical axis. The rotary stages 13 may have different rotation axes from each other.

Figure 8:
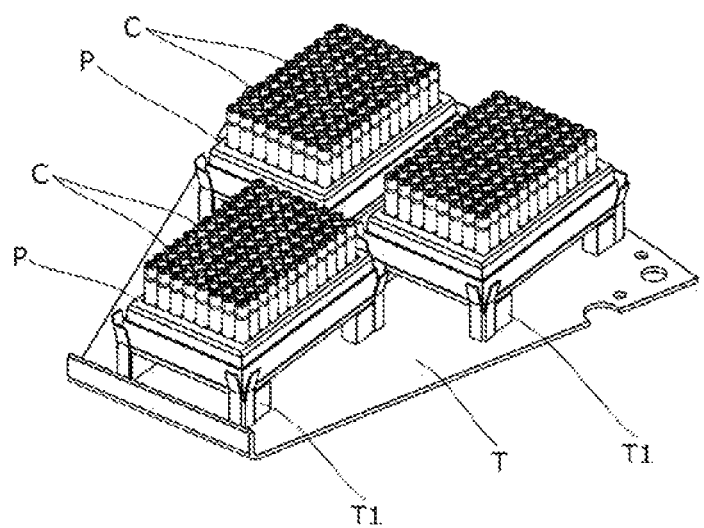
FIG. 8 is a perspective view of a plate holding a plurality of containers and set on a tray.

Each rotary stage 13 is provided with a plurality of storage areas where trays T are disposed. Each storage area is provided with frames that support both sides of a tray T, and a passage slit that opens through in the up-down direction between the frames on both sides. On the tray T, as shown in FIG. 8, there are a plurality of placement parts T1, and each placement part T1 removably receives a storage plate P that accommodates a plurality of capped containers C containing samples. Each rotary stage 13 is formed with slits that open through in the up-down direction. The slit is shaped and sized so as to allow passage of the tray T and a plate-like member 35 to be described later. The uppermost rotary stage 13 is provided with a picking area for transferring a container C held on a storage plate P onto another storage plate P. Thus the picking operation for transferring samples onto another storage plate P can be performed inside the low temperature storage vessel 10, so that the temperature of the samples can be kept low.

Figure 2:
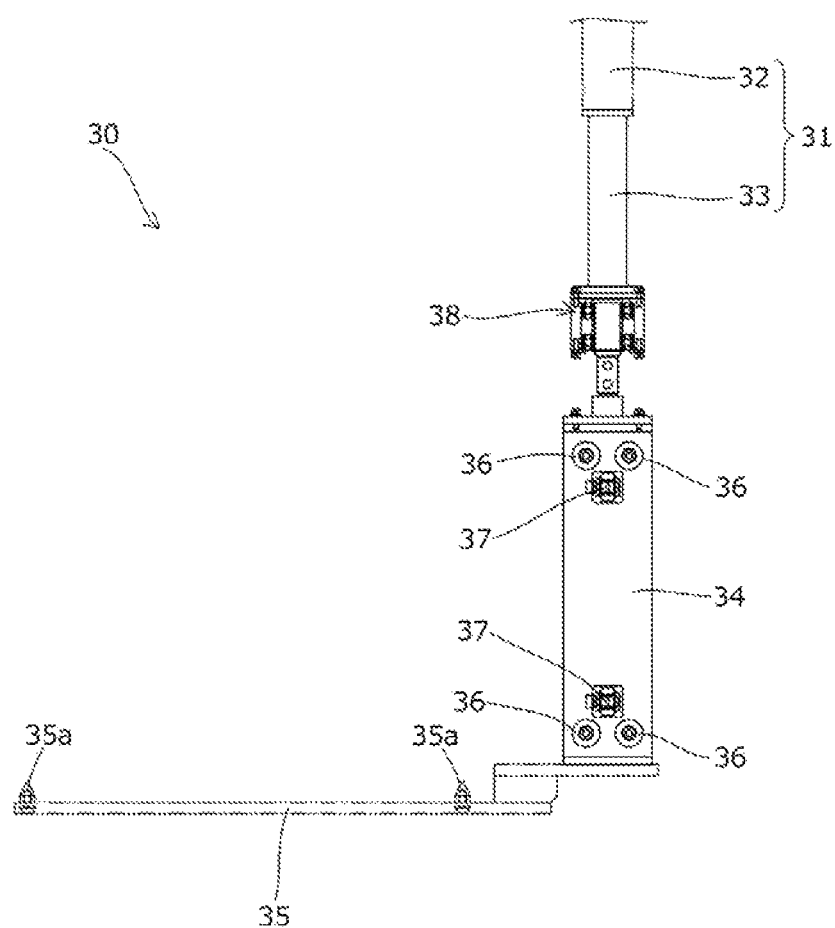
FIG. 2 is a side view illustrating a reciprocating part of a transport mechanism.
Figure 3:
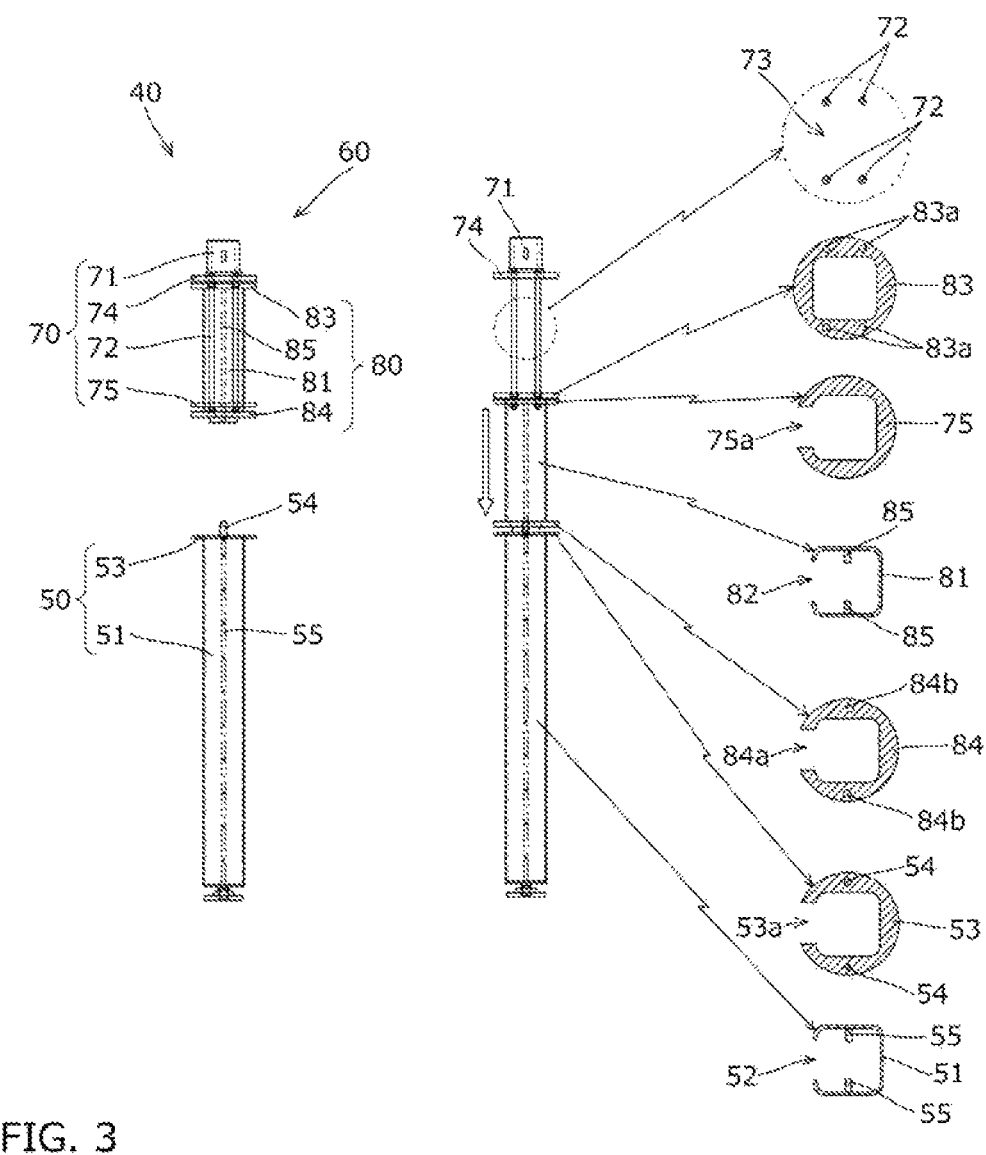
FIG. 3 is an illustrative diagram showing guide unit of the transport mechanism.

The transport mechanism 20 transports the containers C in the up-down direction, and loads and unloads the containers C to and from the low temperature storage vessel 10. As shown in FIG. 1 to FIG. 3, the mechanism includes a reciprocating part 30 disposed so as to be movable back and forth in the up-down direction, and guide unit 40 that guide the reciprocating part 30 in the up-down direction.

The reciprocating part 30 is made up of a moving body 31 capable of reciprocating in the up-down direction, and a distal end tool 34 attached to the lower end of the moving body 31, as shown in FIG. 1 and FIG. 2.

As shown in FIG. 1 and FIG. 2, the moving body 31 is made up of a pair of interlocking chains 32 capable of moving in the up-down direction in a mutually engaged and rigidly united state, as well as capable of running separately in a disengaged state, and a coupling frame 33 fixed to the lower end of the interlocking chains 32. The coupling frame 33 is made of a material having a low thermal conductivity such as fiber reinforced plastic (FRP), to prevent the temperature inside the low temperature storage vessel 10 from rising via the reciprocating part 30.

The distal end tool 34 is rotatable around the vertical axis relative to the moving body 31 via a bearing 38 and attached to the lower end of the coupling frame 33, as shown in FIG. 2. The plate-like member 35 extending in a lateral direction for holding the tray T is formed at the lower end of the distal end tool 34. Driving engagement portions 35a are formed as protrusions on the upper face of this plate-like member 35.

Figure 4:
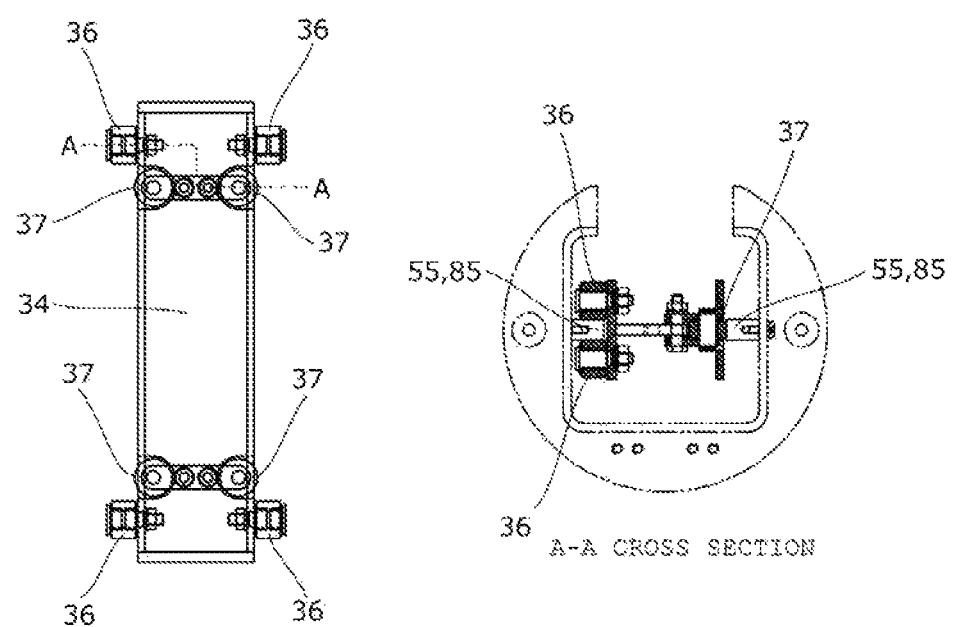
FIG. 4 is an illustrative diagram showing the arrangement of guide rollers in a distal end tool of the reciprocating part, and the positional relationship between the guide rollers of the distal end tool and guide rails.

As shown in FIG. 2 and FIG. 4, the distal end tool 34 is provided with a plurality of first guide rollers 36 and second guide rollers 37. The first guide rollers 36 and second guide rollers 37 are rotatable around laterally extending axes and roll on guide rails 55 and 85 of an in-vessel guide 50 and a slide guide 80 for guiding the up and down movement of the reciprocating part 30. As shown in FIG. 4, the first guide rollers 36 are disposed so as to sandwich the guide rails 55 and 85 of the in-vessel guide 50 and slide guide 80 from lateral directions, while the second guide rollers 37 abut the guide rails 55 and 85 of the in-vessel guide 50 and slide guide 80 from a different lateral direction.

The reciprocating part 30 is driven by a reciprocating drive unit 39 disposed outside the low temperature storage vessel 10 as shown in FIG. 1 to move back and forth in the up-down direction. In this embodiment, the reciprocating drive unit 39 is made up of a sprocket that meshes with the interlocking chains 32 and a rotary motor or the like, but the reciprocating drive unit 39 may have any specific forms as long as it causes the reciprocating part 30 to move back and forth in the up-down direction.

The guide unit 40 include, as shown in FIG. 1 and FIG. 3, the in-vessel guide 50 fixedly placed inside the low temperature storage vessel 10 so as to be rotatable around a vertical axis, and a telescopic guide 60 provided independently of the in-vessel guide 50 and capable of extending and contracting in the up-down direction.

The in-vessel guide 50 includes a tubular main body 51 and an upper flange 53 formed at the upper end of the tubular main body 51, as shown in FIG. 3.

As shown in FIG. 3, two guide rails 55 are disposed on the inner surface of the tubular main body 51, and a passage opening 52 for allowing the plate-like member 35 to stick out is formed in one side face of the tubular main body 51 so as to extend in the up-down direction.

The upper flange 53 is provided with a passage cut-off portion 53a continuous with the passage opening 52 of the tubular main body 51, and a plurality of coupling pins 54 for coupling the in-vessel guide 50 with the slide guide 80, as shown in FIG. 3.

The telescopic guide 60 includes an exterior guide 70 placed outside the low temperature storage vessel 10, and the slide guide 80 supported by the exterior guide 70 so as to be slidable in the up-down direction relative to the exterior guide 70, as shown in FIG. 1 and FIG. 3.

As shown in FIG. 3, the exterior guide 70 includes a tubular main body 71, four rods 72 extending downwards from the lower end of the tubular main body 71, an upper flange 74 formed at the lower end of the tubular main body 71 (upper ends of the rods 72), and a lower flange 75 formed at the lower ends of the rods 72.

The space between the two of the four rods 72 functions as a passage opening 73 for allowing the plate-like member 35 to extend out, and the lower flange 75 is provided with a passage cut-off portion 75a continuous with the passage opening 73, as shown in FIG. 3.

As can be seen from FIG. 1, FIG. 3, and FIG. 6, a rotary drive unit 90 is attached to the tubular main body 71 for rotating the tubular main body 71 around a vertical axis. In this embodiment, the rotary drive unit 90 is made up of a belt attached to the tubular main body 71 and a rotary motor for rotating the belt, but the rotary drive unit 90 may have any specific designs as long as it is disposed outside the low temperature storage vessel 10 and rotates the tubular main body 71.

The slide guide 80 includes, as shown in FIG. 3, a tubular main body 81, an upper flange 83 formed at the upper end of the tubular main body 81, and a lower flange 84 formed at the lower end of the tubular main body 81.

As shown in FIG. 3, two guide rails 85 are disposed on the inner surface of the tubular main body 81, and a passage opening 82 for allowing the plate-like member 35 to stick out is formed in one side face of the tubular main body 81 so as to extend in the up-down direction.

The upper flange 83 has four rod holes 83a for letting the rods 72 pass through, as shown in FIG. 3.

The lower flange 84 is provided with a passage cut-off portion 84a continuous with the passage opening 82 of the tubular main body 81, and a plurality of coupling holes 84b for receiving the coupling pins 54 at the upper end of the in-vessel guide 50 for coupling the in-vessel guide 50 with the slide guide 80, as shown in FIG. 3.

Next, the operation of the transport mechanism 20 will be described below with reference to FIG. 5 and FIG. 6.

Figure 5:
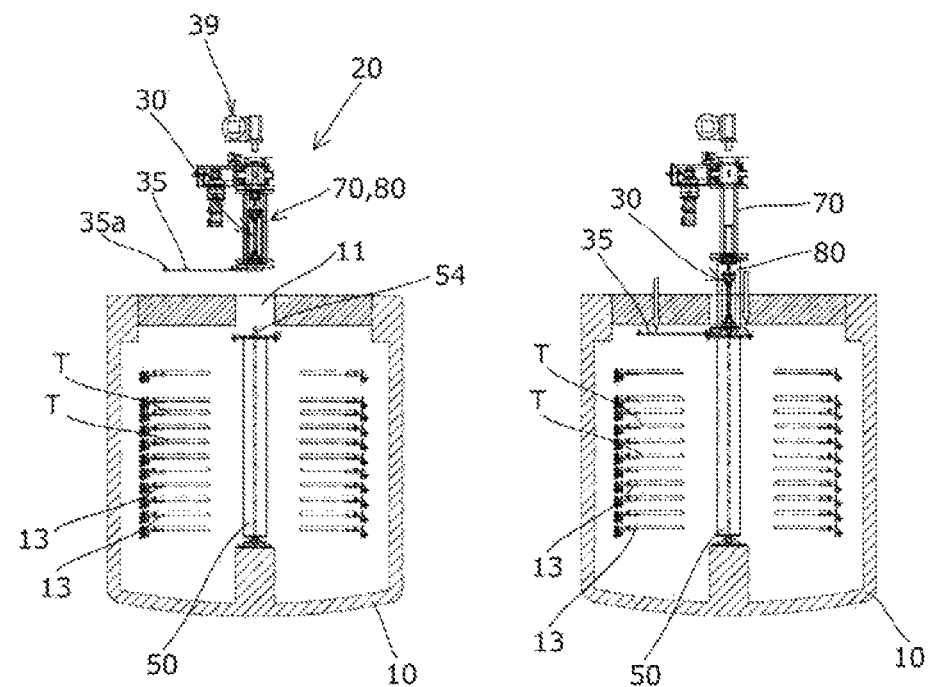
FIG. 5 is a schematic cross-sectional view for explaining the first and second operation steps of the low temperature storage system.

First, in the initial state (non-use state) of the transport mechanism 20, the plate-like member 35 provided to the distal end tool 34 is positioned outside the low temperature storage vessel 10 as shown in the left-side diagram of FIG. 5, and the slide guide 80 is supported by the plate-like member 35 provided to the distal end tool 34 and positioned at its uppermost level (substantially nested in the exterior guide 70).

Next, as shown in the left side and right-side diagrams of FIG. 5, after the shutter 12 that closes the opening 11 has been opened, the reciprocating part 30 (interlocking chains 32, coupling frame 33, and distal end tool 34) is lowered by the reciprocating drive unit 39. As the slide guide 80 slides down with the descending plate-like member 35 of the distal end tool 34, the coupling pins 54 at the upper end of the in-vessel guide 50 fit into the coupling holes 84b at the lower end of the slide guide 80, whereby the slide guide 80 and the in-vessel guide 50 are coupled together. When the slide guide 80 and the in-vessel guide 50 are coupled together, the guide rails 55 inside the slide guide 80 and the guide rails 85 inside the in-vessel guide 50 become continuous with each other in the up-down direction.

Next, as shown in the left side and right-side diagrams of FIG. 5, after the shutter 12 that closes the opening 11 has been opened, the reciprocating part 30 (interlocking chains 32, coupling frame 33, and distal end tool 34) is lowered by the reciprocating drive unit 39. As the slide guide 80 slides down with the descending plate-like member 35 of the distal end tool 34, the coupling pins 54 at the upper end of the in-vessel guide 50 fit into the coupling holes 84b at the lower end of the slide guide 80, whereby the slide guide 80 and the in-vessel guide 50 are coupled together. When the slide guide 80 and the in-vessel guide 50 are coupled together, the guide rails 55 inside the slide guide 80 and the guide rails 85 inside the in-vessel guide 50 become continuous with each other in the up-down direction. With the in-vessel guide 50 and the slide guide 80 being coupled together this way, the guide unit 40 provide support from both sides, so that transfer accuracy can be improved.

Next, as the reciprocating part 30 (interlocking chains 32, coupling frame 33, and distal end tool 34) is further lowered, the reciprocating part 30 moves downward while being guided by the slide guide 80 and the in-vessel guide 50.

Next, as shown in the left-side diagram of FIG. 6, after moving the plate-like member 35 of the distal end tool 34 to a desired position in the up-down direction (lowermost position in the example shown in FIG. 6), the exterior guide 70 is rotated by the rotary drive unit 90. With this rotation of the exterior guide 70, the slide guide 80 and the in-vessel guide 50 are rotated. The rotation of the in-vessel guide 50 is transmitted to the distal end tool 34 of the reciprocating part 30 by the first guide rollers 36 of the distal end tool 34 that sandwich the guide rails 85 of the in-vessel guide 50 from lateral directions, as a result of which the plate-like member 35 of the distal end tool 34 swivels around the vertical axis. Since the distal end tool 34 is coupled to the coupling frame 33 rotatably via the bearing 38, the coupling frame 33 and interlocking chains 32 do not rotate.

While the guide rails 55 and first guide rollers 36 also function as a rotation transmission part for transmitting the rotation of the in-vessel guide 50 to the distal end tool 34 in this embodiment, the rotation transmission part between the in-vessel guide 50 and the distal end tool 34 is not limited to this specific form. Also, while the rotation of the exterior guide 70 is transmitted to the slide guide 80 by the rods 72 of the exterior guide 70 inserted in the rod holes 83a of the slide guide 80 in this embodiment, the rotation transmission part between the exterior guide 70 and the slide guide 80 is not limited to this specific form.

While the telescopic guide 60 (exterior guide 70 and slide guide 80) was described as being entirely driven to rotate by the rotary drive unit 90 in this embodiment, the telescopic guide 60 may be configured such that only part of it, for example the slide guide 80 alone, is rotated.

Next, as shown in the right-side diagram of FIG. 6, the reciprocating part 30 (interlocking chains 32, coupling frame 33, and distal end tool 34) is elevated so that the slide guide 80 is lifted up by the plate-like member 35 of the distal end tool 34, whereby the slide guide 80 is released from the in-vessel guide 50, and returned to its uppermost position outside the low temperature storage vessel 10 (where it is substantially nested in the exterior guide 70).

Next, one example method of transferring a tray T that is an object to be transported will be described below with reference to FIG. 5 and FIG. 6.

First, as shown in the left-side diagrams of FIG. 5 and FIG. 6, the plate-like member 35 is moved down through the slits of the rotary stages 13 to below a rotary stage 13 that carries a target tray T.

Next, as shown in the left-side diagram of FIG. 6, the plate-like member 35 is moved up to allow the driving engagement portions 35a of the plate-like member 35 protruding upward to engage with the lower side of the tray T that is the object to be transported. The plate-like member 35 is then swiveled to rotate the target rotary stage 13 and to move the tray T that is the object to be transported to the position below the slits of other rotary stages 13.

Next, the plate-like member 35 is moved up to bring the tray T that is the object to be transported to a space above the uppermost tier of the rotary stages 13.

Next, the plate-like member 35 is swiveled in the space above the uppermost rotary stage 13 and after that moved down, to set the tray T that is the object to be transported in a picking area on the uppermost rotary stage 13.

Lastly, in the picking area, a picking mechanism (not shown) transfers a desired container C from a storage plate P that was holding the desired container C onto another storage plate P, and the storage plate P accommodating only the desired container C is taken out from the low temperature storage vessel 10 by the plate-like member 35. The storage plate P may be taken out from the low temperature storage vessel 10 by another chucking unit or manually instead of using the plate-like member 35.

While one embodiment of the present invention has been described in detail, the present invention is not limited to the above-described embodiment and may be carried out with various design changes without departing from the scope of the present invention set forth in the claims.

For example, stored objects are described as samples such as biological cells in the embodiment above, but the stored objects are not limited to this specific kind.

The low temperature storage vessel was described as storing objects at an ultra low temperature of −197° C. or the like with liquid nitrogen filled inside in the embodiment above, but the temperature of the low temperature storage vessel and the method of cooling the interior of the low temperature storage vessel are not limited to this specific form. For example, the temperature inside the low temperature storage vessel may be set 10° C. or 20° C. The low temperature storage vessel may be cooled with electricity, or alternatively, gasses such as carbon dioxide gas may be used as cooling means.

In the embodiment above, the low temperature storage vessel was described as being configured to have a plurality of rotary stages with a storage area placed inside the vessel, where the passage slits formed in each rotary stage are aligned so that a transfer path is formed to extend in the up-down direction. The low temperature storage vessel is not limited to the specific form described above and may have any configuration as long as it has a storage area for stored objects and an opening.

While the transfer direction of stored objects was described as the up-down direction in the embodiment above, the moving direction is not limited to this specific form and may be, for example, a horizontal direction. While the opening of the low temperature storage vessel was described as being provided in the upper face of the low temperature storage vessel in the embodiment above, the position of the opening in the low temperature storage vessel may be determined in accordance with the transfer direction of stored objects. From the perspective of reducing escape of cold air from the low temperature storage vessel, it is preferable to provide the opening in the upper face of the low temperature storage vessel.

In the embodiment above, in order to couple the in-vessel guide and the slide guide, coupling pins are formed at the upper end of the in-vessel guide, and coupling holes are formed at the lower end of the slide guide. The coupling design between the in-vessel guide and the slide guide is not limited to this. For example, coupling holes may be formed at the upper end of the in-vessel guide, while coupling pins may be formed at the lower end of the slide guide. Alternatively, block-like protrusions may be formed on one of the in-vessel guide and the slide guide, and groove-like recesses may be formed in the other.

In the embodiment above, the telescopic guide was described as being made up of two guides, the exterior guide and the slide guide. The telescopic guide may have any specific designs as long as it can extend and contract along the transfer direction, such as a three-part design made up of the exterior guide and two slide guides.

Figure 9:
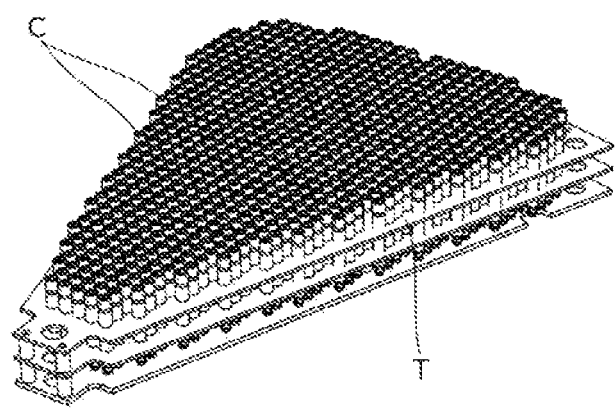
FIG. 9 is a perspective view illustrating a variation example wherein the plurality of containers are directly set on the tray.

In the embodiment above, the storage plate P holding a plurality of containers C was described as being set on a tray T as shown in FIG. 8. The storage design of stored objects is not limited to this specific form. For example, as shown in FIG. 9, a plurality of containers C may be held directly on the tray T, or stored objects may be stored on the tray T as they are.

While the low temperature storage vessel is formed to have a circular cross section in the embodiment described above, the design of the low temperature storage vessel is not limited to this specific form. For example, the low temperature storage vessel may be formed to have a rectangular cross section.

In the embodiment described above, the rotary stages are configured to be able to rotate 360°, but the rotary stages may be configured to rotate in an angle range of less than 360°.

In the embodiment described above, all the rotary stages are provided with a storage area for storing objects, but not all the rotary stages necessarily need a storage area.

An unrotatable stage with a slit may further be provided above the uppermost rotary stage.

In the embodiment described above, the reciprocating part of the transport mechanism for transferring the stored objects in the up-down direction doubles as the driver of the rotary stages, but instead, stage drive means may be provided in addition to the reciprocating part.

While a picking area was described to be provided inside the low temperature storage vessel so that a container held on a storage plate is transferred to another storage plate in this picking area in the embodiment above, the picking area and picking means inside the low temperature storage vessel may be provided suitably as required.

The invention claimed is:

1. A low temperature storage system storing objects at low temperatures, comprising:
   a low temperature storage vessel having a storage area for stored objects, and an opening; and
   a transport mechanism for loading and unloading stored objects to and from said low temperature storage vessel,
   said transport mechanism including a reciprocating part that has a holding part holding the stored objects and that is capable of reciprocating along a transfer direction, and guide unit for guiding said reciprocating part along the transfer direction,
   said guide unit including an in-vessel guide fixedly placed inside said low temperature storage vessel, and an extendable guide configured to be able to extend and contract along said transfer direction,
   said extendable guide being provided independently of said in-vessel guide so as to be connectable to said in-vessel guide, and
   wherein the in-vessel guide includes a guide rail,
   wherein the extendable guide includes a guide rail, and
   wherein the guide rails of the in-vessel guide and the extendable guide are continuous with each other along said transfer direction when the in-vessel guide and the extendable guide are coupled together.

2. The low temperature storage system according to claim 1, wherein said extendable guide is configured to engage with a portion of said reciprocating part and to extend and contract in the transfer direction in conjunction with a reciprocal movement of said reciprocating part.

3. The low temperature storage system according to claim 1, wherein the opening of said low temperature storage vessel is provided in an upper face of said low temperature storage vessel, and
   said reciprocating part is provided so as to be able to reciprocate along an up-down direction.

4. A low temperature storage system storing objects at low temperatures, comprising:
   a low temperature storage vessel having a storage area for stored objects, and an opening; and
   a transport mechanism for loading and unloading stored objects to and from said low temperature storage vessel,
   said transport mechanism including a reciprocating part that has a holding part holding the stored objects and that is capable of reciprocating along a transfer direction, and guide unit for guiding said reciprocating part along the transfer direction,
   said guide unit including an in-vessel guide fixedly placed inside said low temperature storage vessel, and an extendable guide configured to be able to extend and contract along said transfer direction,
   said extendable guide being provided independently of said in-vessel guide so
   as to be connectable to said in-vessel guide, and
   further comprising rotary drive unit for rotating at least part of said extendable guide around an axis extending along said transfer direction, wherein
   said in-vessel guide is provided so as to be rotatable around said axis, and includes a rotation transmission part for transmitting rotation of said in-vessel guide to said reciprocating part.

5. The low temperature storage system according to claim 4, wherein said reciprocating part includes a moving body capable of reciprocating along said transfer direction, and a distal end tool connected to said moving body so as to be rotatable around said axis relative to said moving body, said distal end tool having said holding part.

6. A low temperature storage vessel for a low temperature storage system storing objects at low temperatures,
   said low temperature storage vessel including a storage area for stored objects, an opening for allowing stored objects to be loaded and unloaded, and
   an in-vessel guide fixedly placed inside said low temperature storage vessel, said in-vessel guide guiding a reciprocating part that loads and unloads stored objects along a transfer direction, said in-vessel guide being provided so as to be connectable to an extendable guide that is configured to be able to extend and contract along said transfer direction and to guide said reciprocating part along the transfer direction, and
   wherein the in-vessel guide includes a guide rail,
   wherein the extendable guide includes a guide rail, and
   wherein the guide rails of the in-vessel guide and the extendable guide are continuous with each other along said transfer direction when the in-vessel guide and the extendable guide are coupled together.

* * * * *